H. F. BUSCH.
METHOD OF MAKING HEATED INSULATING MATERIAL.
APPLICATION FILED MAY 27, 1905. RENEWED MAY 2, 1907.

967,720.

Patented Aug. 16, 1910.

5 SHEETS—SHEET 1.

WITNESSES
R H Balderson.
Warren W. Swartz

INVENTOR
Herman F. Busch
by his Attorneys
Bakewell & Byrnes

H. F. BUSCH.
METHOD OF MAKING HEATED INSULATING MATERIAL.
APPLICATION FILED MAY 27, 1905. RENEWED MAY 2, 1907.

967,720.

Patented Aug. 16, 1910.
5 SHEETS—SHEET 2.

WITNESSES
R A Balderson.
Warren W. Swartz

INVENTOR
Herman F. Busch
by his Attorneys
Bakewell & Byrnes

H. F. BUSCH.
METHOD OF MAKING HEATED INSULATING MATERIAL.
APPLICATION FILED MAY 27, 1905. RENEWED MAY 2, 1907.

967,720.

Patented Aug. 16, 1910.
5 SHEETS—SHEET 3.

WITNESSES

INVENTOR

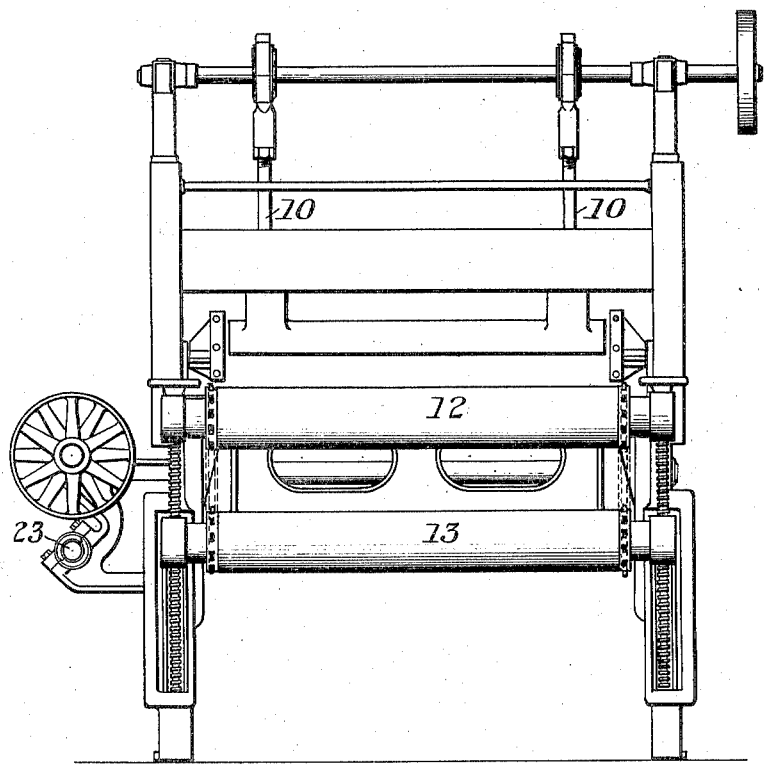

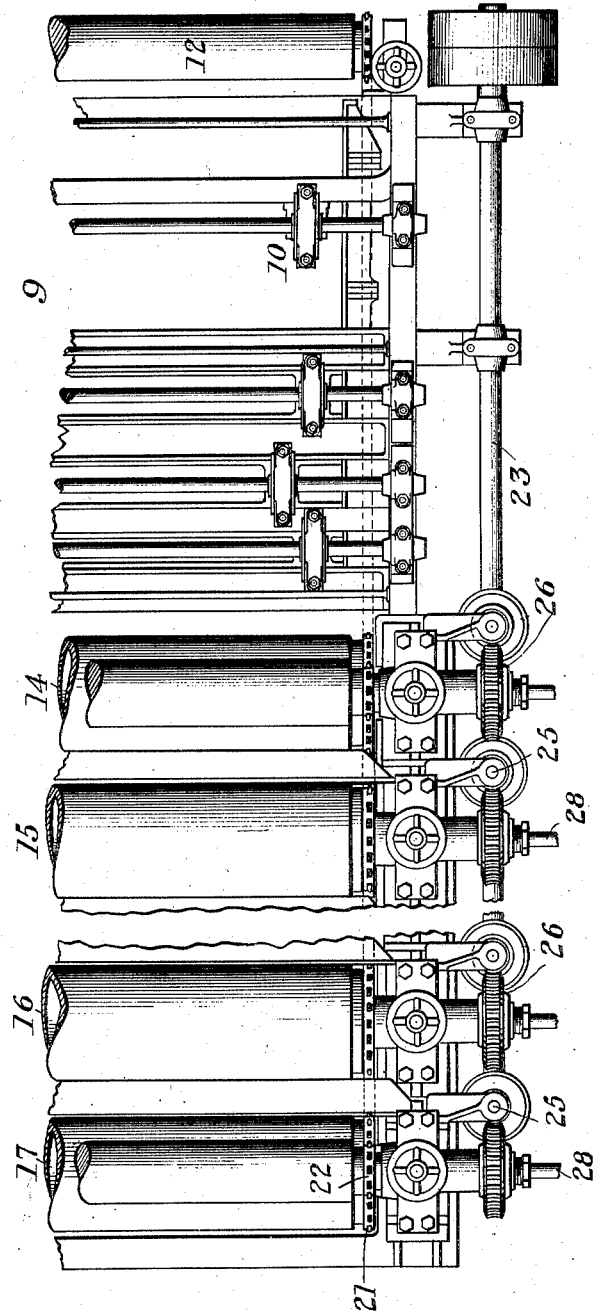

UNITED STATES PATENT OFFICE.

HERMAN F. BUSCH, OF MILLVALE, PENNSYLVANIA, ASSIGNOR TO ARMSTRONG CORK COMPANY, OF PITTSBURG, PENNSYLVANIA, A CORPORATION OF PENNSYLVANIA.

METHOD OF MAKING HEATED INSULATING MATERIAL.

967,720.  Specification of Letters Patent.  Patented Aug. 16, 1910.

Application filed May 27, 1905, Serial No. 262,591.  Renewed May 2, 1907.  Serial No. 371,471.

*To all whom it may concern:*

Be it known that I, HERMAN F. BUSCH, of Millvale, Allegheny county, Pennsylvania, have invented a new and useful Method of Making Heated Insulating Material, of which the following is a full, clear, and exact description, reference being had to the acompanying drawings, forming part of this specification, in which—

Figure 1:
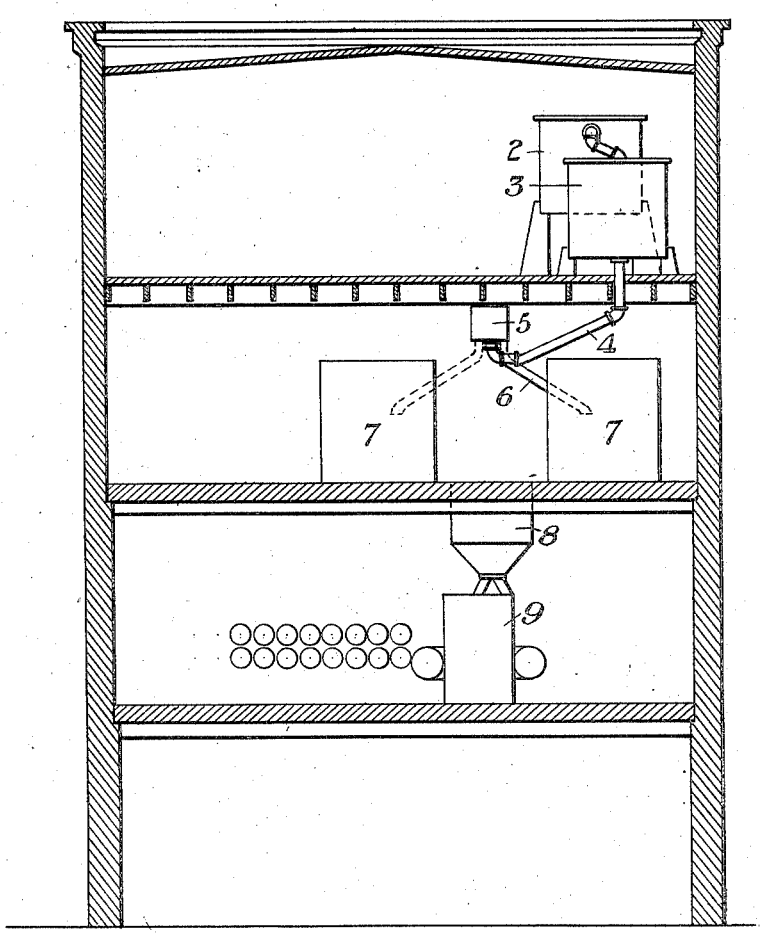
Figure 2:
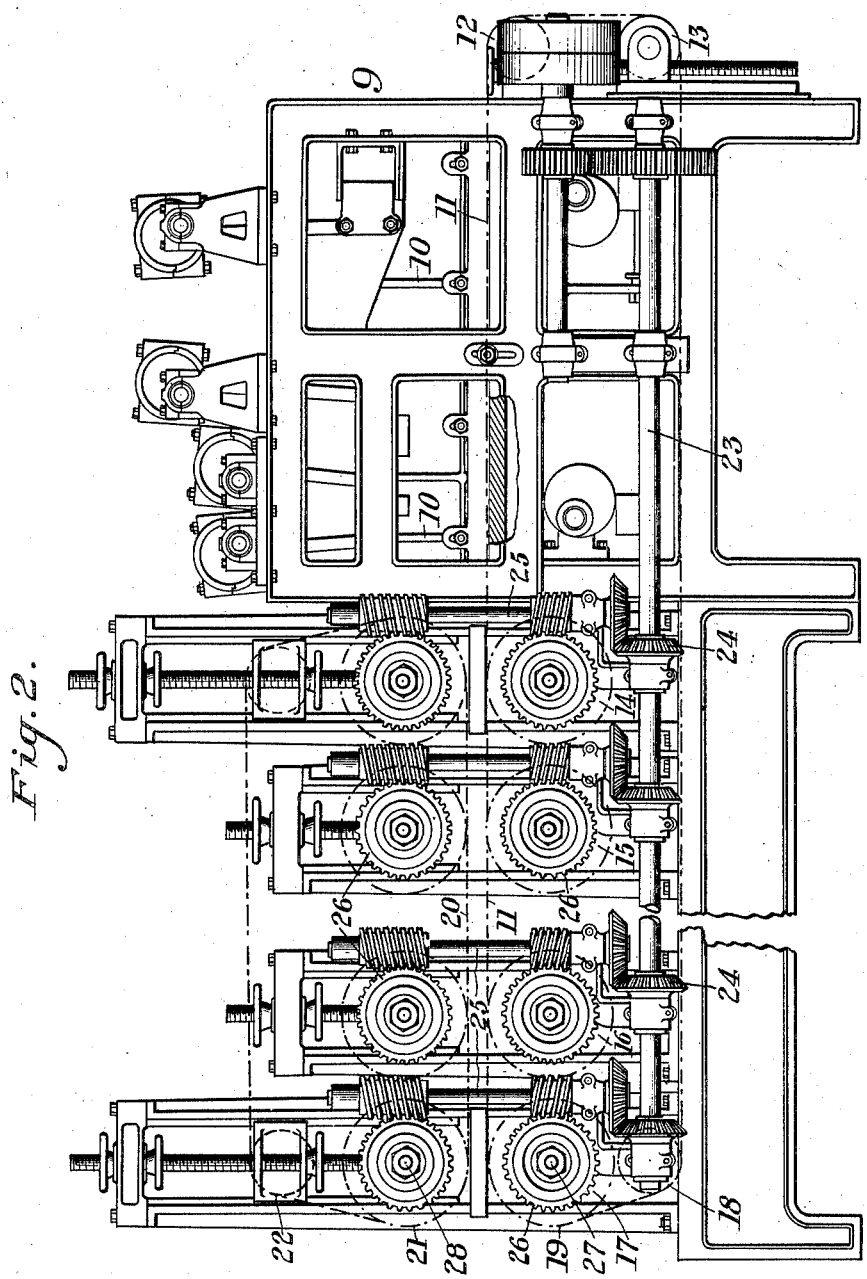
Figure 3:
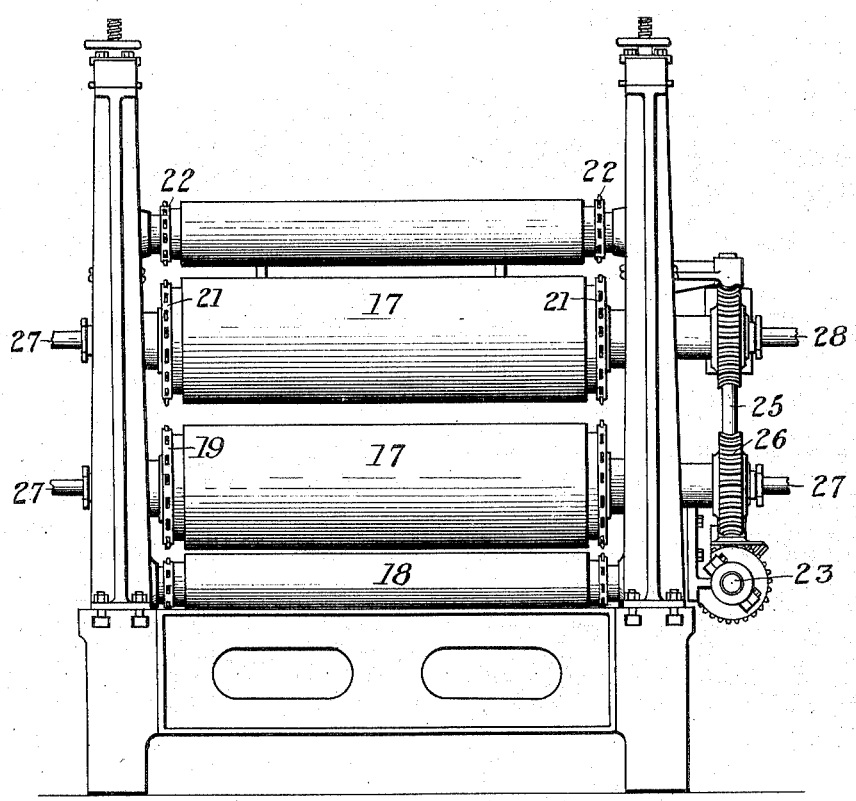

Figure 1 is a diagrammatic view showing the general arrangement of apparatus arranged for carrying out my invention; Fig. 2 is a side elevation partly broken away showing in detail apparatus for carrying out the latter portion of my process; Fig. 3 is an end view of the rolls; Fig. 4 is an end view of the tamping machine, and Fig. 5 is a partial plan view of the tamping and rolling apparatus.

My invention relates to the making of heated insulating material by means of cork and a binder therefor, and consists in a new and improved method of producing such material and also in the product thus obtained.

In carrying out my process in its preferred form, I heat the granulated cork in any suitable manner, as by stirring it in a heated vessel. I then mix the heated cork with hot or liquid pitch or asphalt and roll the mixture into sheet form, preferably by the use of a series of rolls arranged in tandem. I also preferably graduate the temperature of these rolls so that they will gradually cool the mixture while it is being rolled and pressed.

I have found that by heating the granulated cork before it is mixed with the pitch or asphalt, I can avoid the introducing of any other material with the pitch or asphalt; and at the same time obtain a well-mixed material without lumps, each granule having a thin coating of the pitch or asphalt. I have found that the insulating properties of the material are improved if pitch or asphalt alone is used as the binder; though of course other materials may be used to some small degree.

In carrying out my process with the apparatus shown in the drawings, I melt the pitch or asphalt in a heated kettle 2, from which it runs in liquid condition into the kettle 3. From the kettle 3 the melted binder runs through pipe 4 into a measuring device 5, from which it may be fed through a pipe 6 into either of the mixing kettles 7, 7. The pipe 6 is arranged to swing so as to fit the binder to either kettle in measured quantities.

Each of the mixing kettles is preferably of the steam-jacketed type, and before the binder is fed into it the cork is placed therein, and heated while being stirred, preferably by suitable mechanical stirrers. Under this heating and stirring the cork granules become warm and heated throughout so that they are in good condition to receive the binder. The measured amount of binder is then fed into one of the kettles and mixed with the cork by stirring under heat, and the heated mixture is then fed through a steam-jacketed hopper 8 into a tamping machine 9. This tamping machine, as shown in Figs. 2, 3 and 4, is provided with separate tamping bars 10, which in the form shown are four in number and are restricted to tamping the cork as it is fed onto a belt 11 which carries the cork mixture through the tamping machine. The belt 11 is of the same width as the tamping machine and moves over a stationary bed-plate, against which the tampers operate, this bed-plate forming a backing for the belt. The belt passes over rollers 12 and 13 on the tamping machine, and in the upper part of its travel moves between a series of pressing rollers, of which I have shown four pairs, 14, 15, 16, 17.

After passing through the last pair of rolls the belt returns over roller 18 and back to roller 13. The belt is made in the form of a wide belt with sprocket chains attached to its opposite edges, and these sprocket chains engage corresponding sprocket wheels 19 which are secured to the pressing rollers. The belt 11 lies in contact with the surfaces of the lower rolls, and a corresponding belt 20 with sprocket chains at its edges moves in contact with the surfaces of the upper pressing rollers, being carried over the sprocket wheels 21 and 22 at the ends of its travel. I have shown these rollers as driven from a shaft 23 through bevel gears 24, worm shaft 25 engaging worm wheels 26 on the roller shafts. Each pressing roll is made hollow with hollow trunnions into which lead pipes 27 and 28 from which fluid is circulated within the bodies of the rolls.

This fluid may be steam, water, ammonia, or other suitable heating or cooling agent; and I preferably apply the fluid in such a way as to make the rolls of successively lower temperature from the tamping machine to the end of the series of rolls. The upper roll of each pair of the series may be adjusted toward or from the lower roll so as to change the thickness of the cork sheet produced when desired.

In carrying out my process, the asphalt or pitch is heated and liquefied and then fed alternately into the mixing kettles wherein the cork has previously been mixed and heated. The heated mixture is then fed onto the belt within the tamping machine and the tampers act upon it as the carrier moves the mixture through the tamping machine. The carrier then moves the continuous cork sheet through and between the successive pairs of rollers, which may be of any desirable number, and by which rolling pressure is applied as the sheet gradually cools. The rollers nearest the tamping machine will preferably be warmed or heated while the last rolls will preferably be cooled by water or a refrigerator medium circulated through them. I thus obtain a continuous sheet of the insulating material, which may then be cut to any desirable size or shape.

The advantages of the invention result mainly from the rolling of the cork layer as it is cooled. A large output may thus be obtained and a practically continuous operation provided for. The tamping may or may not be used prior to carrying the material fed into the web or carrier in between the rolls; though I prefer to employ it to better distribute the cork and make a substantially uniform layer of the mixture on the web before it enters the rollers. The number of rolls employed may be varied, as may also the apparatus for mixing the binder and cork before feeding it upon the web. Other binders may be employed within the scope of my broader claims, the carrier for moving the cork between the rolls may also be changed, and many other variations may be made without departing from my invention.

I claim:—

1. The method of manufacturing insulating material, which consists in mixing granulated cork with a binder in a heated condition, then feeding and spreading the mixture upon a support, then pressing and cooling the mixture, and removing the pressed material from the support; substantially as described.

2. The method of manufacturing insulating material, which consists in mixing heated granulated cork with a binder in a heated condition, then feeding and spreading the mixture upon a moving support, then passing the support under a roll to press the material, and then removing the article from the support; substantially as described.

3. The method of making insulating material, consisting in mixing heated granulated cork with a binder in a heated condition, then spreading the mixture into sheet form, and then rolling the sheet; substantially as described.

4. The method of making insulating material, consisting in mixing a heated mass of cork in comminuted or granular form with a binder, then spreading it upon a moving belt, then passing the material under a second moving belt to press material, cooling the material while still under pressure, and then removing it from the belts; substantially as described.

5. The method of making insulating material consisting in mixing granulated cork with a binder in heated condition, then passing such mixture between a series of pressing rolls to press the granules, and cooling the mixture during the rolling operation and while still under pressure; substantially as described.

6. The method of making insulating material consisting in spreading a hot mixture of comminuted or granulated cork and a binder on a moving support, then pressing the hot mixture on the moving support until set and cooled; substantially as described.

7. The method of making a cork sheet or strip, consisting in continuously forming a layer of a heated mixture of granulated cork and a binder, on a moving support, then passing the support under a continuous cooling and pressing device and keeping the material under pressure on said support until it has cooled; substantially as described.

8. The method of manufacturing insulating material, consisting in forming a heated mass of the insulating substance in comminuted or granular form and a binder, and then passing such mixture through a series of pressing rolls to cool and press the mixture and keeping the material under pressure until it has set and cooled; substantially as described.

9. The method of making insulating material consisting in passing a hot mixture of cork with a binder between two traveling belts, then passing the belts between pressing rolls to cool and press the mixture and keeping the mixture under the action of the rolls until it has cooled sufficiently to permanently set; substantially as described.

10. The method of making insulating material, consisting in heating granulated or comminuted cork and mixing it while heated with a hot binder, then shaping the hot mixture of granulated cork and the binder, then compressing the shaped mixture, and holding it under compression between forming surfaces until it is set, substantially as described.

11. The method of making insulating material, which consists in spreading a heated mixture of cork and a binder on a belt, then passing the belt with the mixture under another belt to contact with the opposite surface of the mixture, then passing the belts and material between a plurality of sets of rolls and keeping it under the pressure of the rolls sufficiently long to set the granules, and then removing it from between the belts; substantially as described.

12. The herein described method of manufacturing insulating material, which consists in mixing granulated cork and a binder in heated condition, then discharging the mixture on to a conveyer, then tamping the mixture on the conveyer, and then conveying the mixture on the conveyer through a series of rolls and causing said rolls to also exert a gradual cooling action upon the material regulated, substantially as described.

13. The herein described method of manufacturing insulating material, which consists in forming a heated mixture of cork and binding material, and then passing such mixture through a series of pressing rollers having heated surfaces of progressively lower temperatures to thereby gradually cool the material while it is under pressure; substantially as described.

14. The herein described method of manufacturing insulating material, which consists in heating granulated cork and mixing it with a hot binder, then discharging the mixture on to a conveyer, then tamping the mixture on the conveyer, and then carrying the mixture through pressing rolls; substantially as described.

15. The herein described method of manufacturing insulating material, which consists in mixing granulated cork and a binder while both are in a heated condition, then discharging the mixture on to a conveyer, then tamping the mixture on the conveyer, and then carrying the mixture through pressing rolls, substantially as described.

16. The herein described method of making sheet-form insulating material, which consists in mixing granulated cork with a binder while both are in heated condition, then pressing the mixture into sheet form, and then rolling the sheet; substantially as described.

17. The method of making a cork sheet or strip, which consists in continuously forming a layer of granulated cork, simultaneously compressing and heating said layer as it is formed, and then progressively cooling and holding said layer under compression during such cooling, the material being heated, pressed and cooled substantially out of contact with the air; substantially as described.

18. The method of manufacturing insulating material, consisting in feeding a heated mixture of granulated cork and a binder upon a conveyer, then applying another conveyer to the opposite side of the material, and then feeding the conveyers and material between pressing rolls, part of said rolls being artificially cooled while under pressure; substantially as described.

19. Apparatus for the purpose described, having a mixing kettle, a tamping machine, a steam-jacketed hopper arranged to feed the material from the mixing kettle into the tamping machine, a conveyer belt extending through the tamping machine, a series of pressing rollers between which said belt also passes, and means for heating the surfaces of the rollers, substantially as described.

20. Apparatus for the purpose described, having a mixing vessel, a tamping machine, means for feeding the material from the mixing vessel into the tamping machine, a pair of conveyer belts, one of which extends through the tamping machine, and pressing rollers between which the belts pass, substantially as described.

21. Apparatus for the purpose described, having a mixing vessel, a tamping machine, means for feeding the material from the mixing vessel to the tamping machine, a series of rolls, and a pair of conveyer belts for carrying the material from the tamping machine through the rolls; substantially as described.

In testimony whereof, I have hereunto set my hand.

HERMAN F. BUSCH.

Witnesses:
JOHN MILLER,
H. M. CORWIN.